United States Patent
Kawakatsu et al.

(10) Patent No.: US 8,164,641 B2
(45) Date of Patent: Apr. 24, 2012

(54) PHOTOGRAPHIC DEVICE AND PHOTOGRAPHING METHOD

(75) Inventors: Yasuhiro Kawakatsu, Kawasaki (JP); Koji Shimizu, Osaka (JP)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 12/505,656

(22) Filed: Jul. 20, 2009

(65) Prior Publication Data
US 2010/0020190 A1      Jan. 28, 2010

(30) Foreign Application Priority Data
Jul. 28, 2008    (JP) .................................. 2008-193207

(51) Int. Cl.
*H04N 5/225* (2006.01)
(52) U.S. Cl. ......................... 348/218.1; 348/36; 382/284
(58) Field of Classification Search .................... None
See application file for complete search history.

(56) References Cited

U.S. PATENT DOCUMENTS

| 6,834,128 | B1 * | 12/2004 | Altunbasak et al. | 382/284 |
| 2006/0215930 | A1 * | 9/2006 | Terui | 382/284 |
| 2007/0030396 | A1 * | 2/2007 | Zhou et al. | 348/700 |

FOREIGN PATENT DOCUMENTS

| EP | 734155 A1 * | 9/1996 |
| JP | 2004-236910 A | 8/2004 |

* cited by examiner

*Primary Examiner* — Lin Ye
*Assistant Examiner* — Dennis Hogue
(74) *Attorney, Agent, or Firm* — Westerman, Hattori, Daniels & Adrian, LLP

(57) ABSTRACT

A photographing device includes a motion amount calculation unit that calculates a motion amount of an image in the successive images, an image selection unit that selects an image to be processed based on the motion amount, and an image combination unit that combines overlapped parts by using a plurality of partially overlapped images selected by the image selection unit.

8 Claims, 8 Drawing Sheets

PHOTOGRAPHIC DEVICE AND PHOTOGRAPHING METHOD

CROSS-REFERENCE TO RELATED APPLICATION

This application is based upon and claims the benefit of priority of the prior Japanese Patent Application No. 2008-193207, filed on Jul. 28, 2008, the entire contents of which are incorporated herein by reference.

FIELD

The present invention relates to a photographic device and a photographing method. The preset invention relates to, for example, a technique for photographing a panoramic image having a large angle of view by an electronic device that includes a camera module with a lens having a small angle of view by dividing the image into a plurality of sections and combining the photographed images.

BACKGROUND

In general, a camera module for a small electronic device with a digital camera often includes a small lens module to prioritize size reduction and is capable of photographing just an image having a small angle of view. To photograph a wide-angle object such as a scenery photograph by using the above-described digital camera with a small lens module, partially overlapping images that are photographed a number of times are combined into one image.

To specify a position at which the partially overlapped images are combined, a photographer obtains a plurality of images to be combined at the time of photographing a plurality of images by following a guide displayed on a finder screen and repeating the photographing operation while adjusting the device to a correct direction.

For example, Japanese Laid-Open Patent Publication No. 2004-236910 discloses the technique for combining a plurality of images based on a set positioning amount and a set combining part between the plurality of partially overlapped images.

To photograph an image having a large angle of view using a camera module with a lens having a small angle of view, a photographer photographs an image while dividing the image into a plurality of sections and then combines the photographed images. At the time of performing this combining processing, the photographer follows the guide displayed on the finder screen and repeats the photographing operation while adjusting the device to the correct direction. Accordingly, in addition to the complexity of the operation, the images may be misaligned in the combining part if the photographer is unfamiliar with the operation and fails to adjust the device to the correct direction.

Although it is possible to combine images from successive images photographed as a motion picture into a panoramic image, the panoramic image may be difficult to compose by simply combining adjacent images because the successive images in the motion picture include various movements of a person, an object, or the like.

SUMMARY

According to an aspect of the invention, a photographing device that combines images from successive images photographed by a camera module into a panoramic image includes a motion amount calculation unit that calculates a motion amount of an image in the successive images, an image selection unit that selects an image to be processed based on the motion amount, and an image combination unit that combines overlapped parts by using a plurality of partially overlapped images selected by the image selection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE EMBODIMENTS

Figure 1:
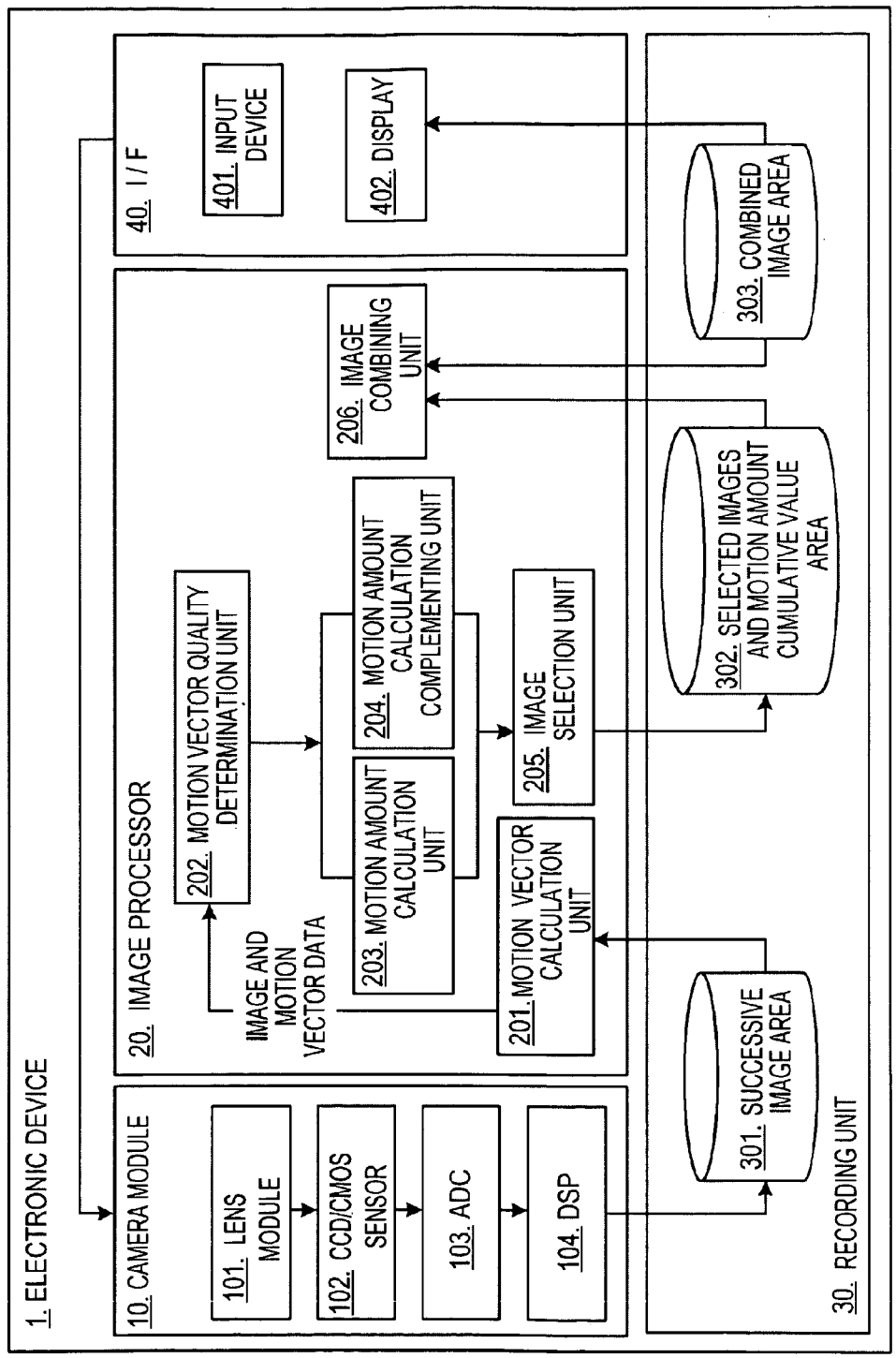
FIG. 1 is a diagram illustrating a configuration of an electronic device that includes a digital camera module and an image processor.

With reference to the diagrams, a preferable embodiment of the present invention will be described below. In the diagrams, similar configuration elements have the same reference numerals. FIG. 1 illustrates a configuration of an electronic device 1 that includes a camera module 10. The electronic device 1 further includes an image processor 20, a recording unit 30, and a user interface (hereinafter referred to as "I/F") 40 that is connected to an input device 401 as, for example, a key and to a display 402.

The camera module 10 includes a lens module 101, a CCD/CMOS sensor 102 for photographing, an analog-digital converter (hereinafter referred to as "ADC") 103, and a digital signal processor (hereinafter referred to as "DSP") 104.

The image processor 20 includes a motion vector calculation unit 201 that calculates a difference of a position compared to the previous image in each small rectangular-shaped range, called a macro block, in an image; a motion vector quality determination unit 202 that chooses a motion vector to be calculated for image selection and determines whether or not the motion amount may be calculated; a motion amount calculation unit 203 that calculates the motion amount of the image based on motion vector information; a motion amount calculation complementing unit 204 that estimates the motion amount based on the past calculation history if no information for calculation of the motion amount is obtained; an image selection unit 205 that determines the cumulative value of the motion amount and the image to be combined based on the calculated motion amount; and an image combining unit 206 that combines overlapped parts of the images to be combined into one single image. The image processor 20 may be mounted in a form where at least a part of the image processor 20 may be hardware such as an integrated circuit, for example, or in a form where at least a part of the image processor 20 may be software such as a program operated on the image processor 20.

The recording unit 30 includes a successive image area 301, a selected images and motion amount cumulative values area 302, and a combined image area 303. The successive image area 301 stores a plurality of images obtained by the camera module 10 at fixed time intervals. The selected image and motion amount cumulative value area 302 stores a plurality of images to be combined and a motion amount cumulative value indicating a relative position between images. The combined image area 303 stores an image-processed output image.

The user I/F 404 is connected to the input device 401 that includes a key and to the display 402, supplies key input of a photographer to the camera module 10, and displays a photographed image and an image-processed image on the display 402.

In FIG. 1, the camera module 10 starts photographing a plurality of successive images when a photographing start button is pressed by the photographer, and then stores the plurality of image data in the successive image area 301. During the photographing of successive images, the photographer inputs a wide-angle image to be photographed such as a scenery photograph by motion the electronic device 1 laterally. As for the input successive images, the motion vector calculation unit 201 calculates position difference information, called a motion vector, between the image and the previous image in each section as a 16*16 pixel block called a macro block in the image. As for the vectors in all the macro blocks, the motion vector quality determination unit 202 chooses only the vectors used for the processing and then determines whether or not the motion amount may be calculated. The motion amount calculation unit 203 calculates the motion amount of the image based on the motion vector selected by the motion vector quality determination unit 202. If the number of effective motion vectors is small after the vectors are selected, the motion amount calculation complementing unit 204 performs processing by using the motion amount calculated in the past. The image selection unit 205 accumulates the motion amount and selects the image as an image to be combined at the time when a fixed motion amount is accumulated. The image combining unit 206 combines the selected images to be combined and stores, in the combination image area 303, the wide-angle image as the output result.

Figure 2:
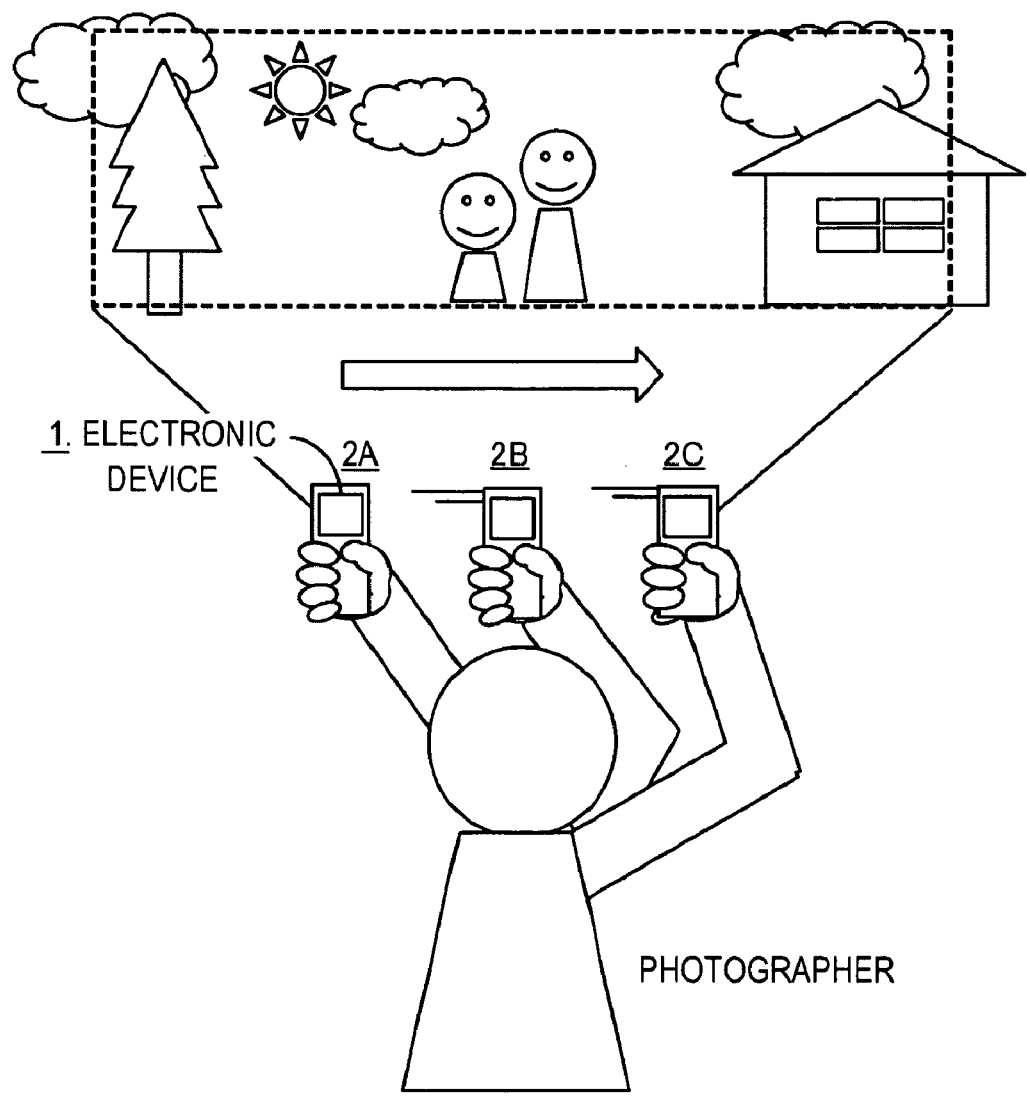
FIG. 2 is a diagram illustrating a photographing operation by the electronic device that includes the digital camera module and the image processor.

FIG. 2 illustrates a photographing operation by the electronic device 1 according to the present embodiment. The electronic device 1 starts photographing a plurality of successive images when the photographing start button is pressed by the photographer, and then stores the photographed image data in the successive image area 301. During the photographing of successive images, the photographer inputs the wide-angle image to be combined, such as a scenery photograph, in the camera module 10 by motion the electronic device 1 laterally. 2A, 2B, and 2C indicate the position of the electronic device 1 at the time of starting photographing, the position of the electronic device 1 during the photographing, and the position of the electronic device 1 at the time of ending the photographing, respectively.

Figure 3:
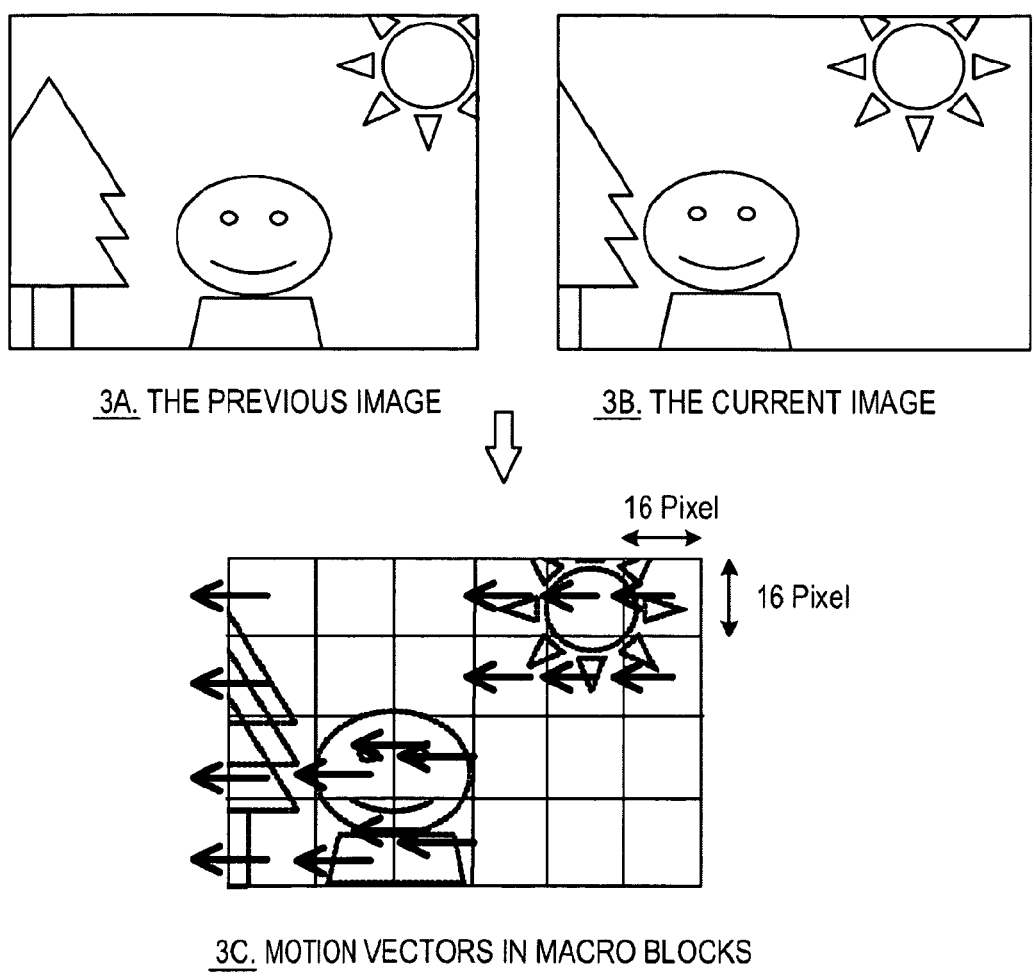
FIG. 3 is a diagram illustrating an input image and an output result of a motion vector calculation unit.

FIG. 3 illustrates an input image and an output result of the motion vector calculation unit 201. Based on the input of the successive images from the successive image area 301, the motion vector calculation unit 201 calculates position difference information, called a "motion vector," between the previous image indicated as FIG. 3A and the current image indicated as FIG. 3B having a two dimensional value in each section as a 16*16 pixel block called a macro block. The motion vector may not be calculated depending on the macro block. The macro block in which the motion vector may not be calculated is called an "intra macro block." FIG. 3C illustrates images sectioned into macro blocks and a motion vector in each macro block.

Figure 4:
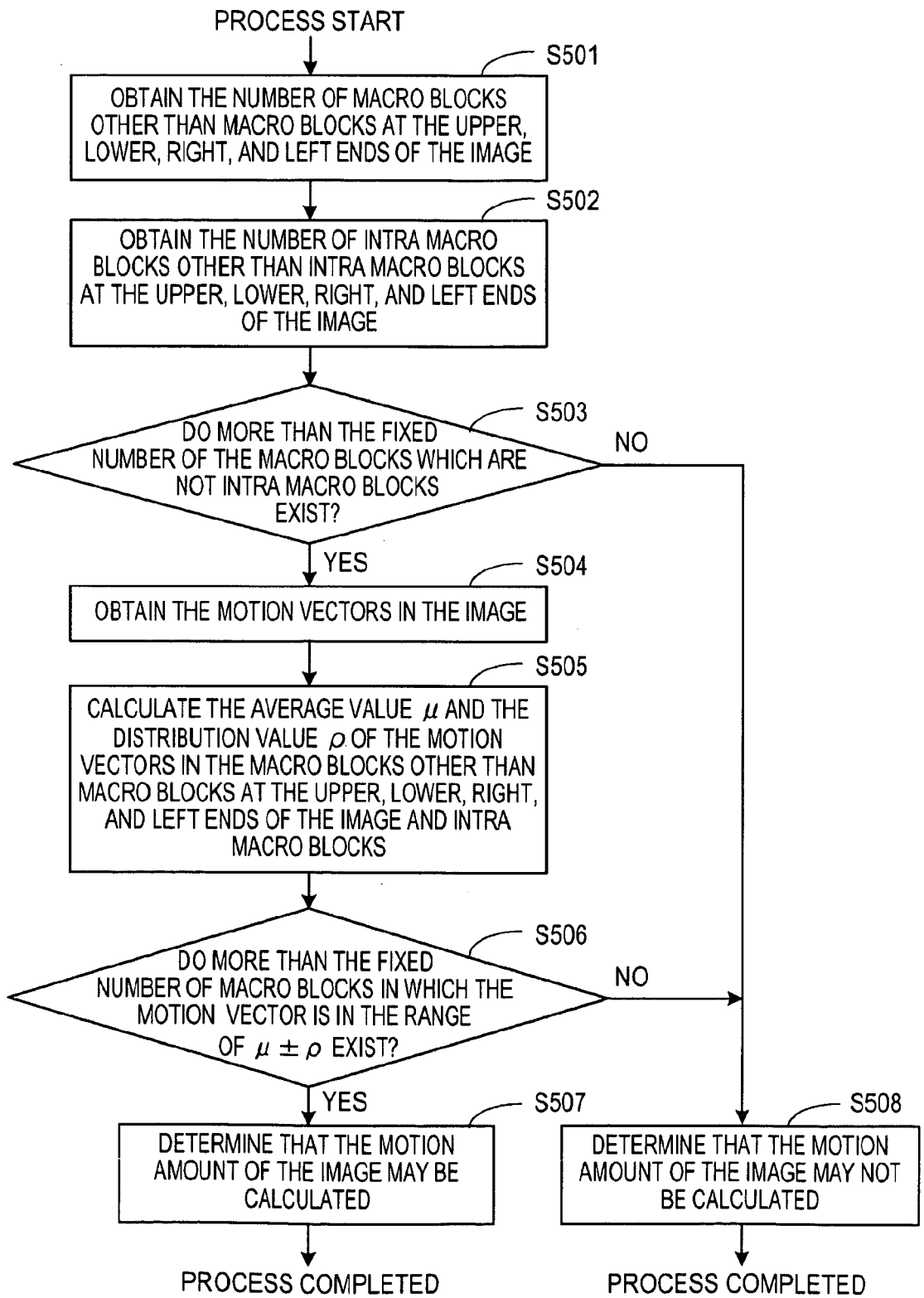
FIG. 4 is an operation flowchart for determining whether or not a motion amount of an image may be calculated.

FIG. 4 illustrates a flowchart for determining whether or not the motion amount of the image may be calculated.

In step S501 and step S502, the motion vector quality determination unit 202 reads the motion vector, obtained as the result of the processing of the motion vector calculation unit 201, in each macro block in the image. The macro block may be the intra macro block having no motion vector. Furthermore, a motion photographic object may come into a frame during the photographing, so that macro blocks at the upper, lower, right, and left ends of the image and intra macro blocks are not used to calculate the motion amount of the image. In step S503, it is determined whether or not there are more than a fixed number of macro blocks used for calculation of the motion amount. If it is determined that there are not more than the fixed number of macro blocks used for calculation of the motion amount in step S503, it is determined that the motion amount of the object image may not be calculated in step S508.

If it is determined that there are more than the fixed number of macro blocks used for calculation of the motion amount in step S503, it is determined that the motion amount of the object image may be calculated in step S508. In step S504 and step S505, the average value μ and the distribution value ρ of the motion vectors in the macro blocks other than the macro blocks at the upper, lower, right, and left ends of the image and the intra macro blocks are calculated. As for the macro block having the motion vector with a value exceeding the range of average value μ±distribution value ρ, it is determined that image noise exists or a motion photographic object has come into a frame during the photographing, and so such a macro block is not used to calculate the motion amount of the image. In step S506, it is determined whether or not there are more than the fixed number of the macro blocks in which the motion vectors as objects of calculation of the motion amount are equal to or within the range of average value μ±distribution value ρ. If it is determined that there are not more than the fixed number of macro blocks used for calculation of the motion amount in step S506, it is determined that the motion amount of the object image may not be calculated in step S508. If it is determined that there are more than the fixed number of macro blocks used for calculation of the motion amount in step S506, it is determined that the motion amount of the object image may be calculated in step S507.

Figure 5:
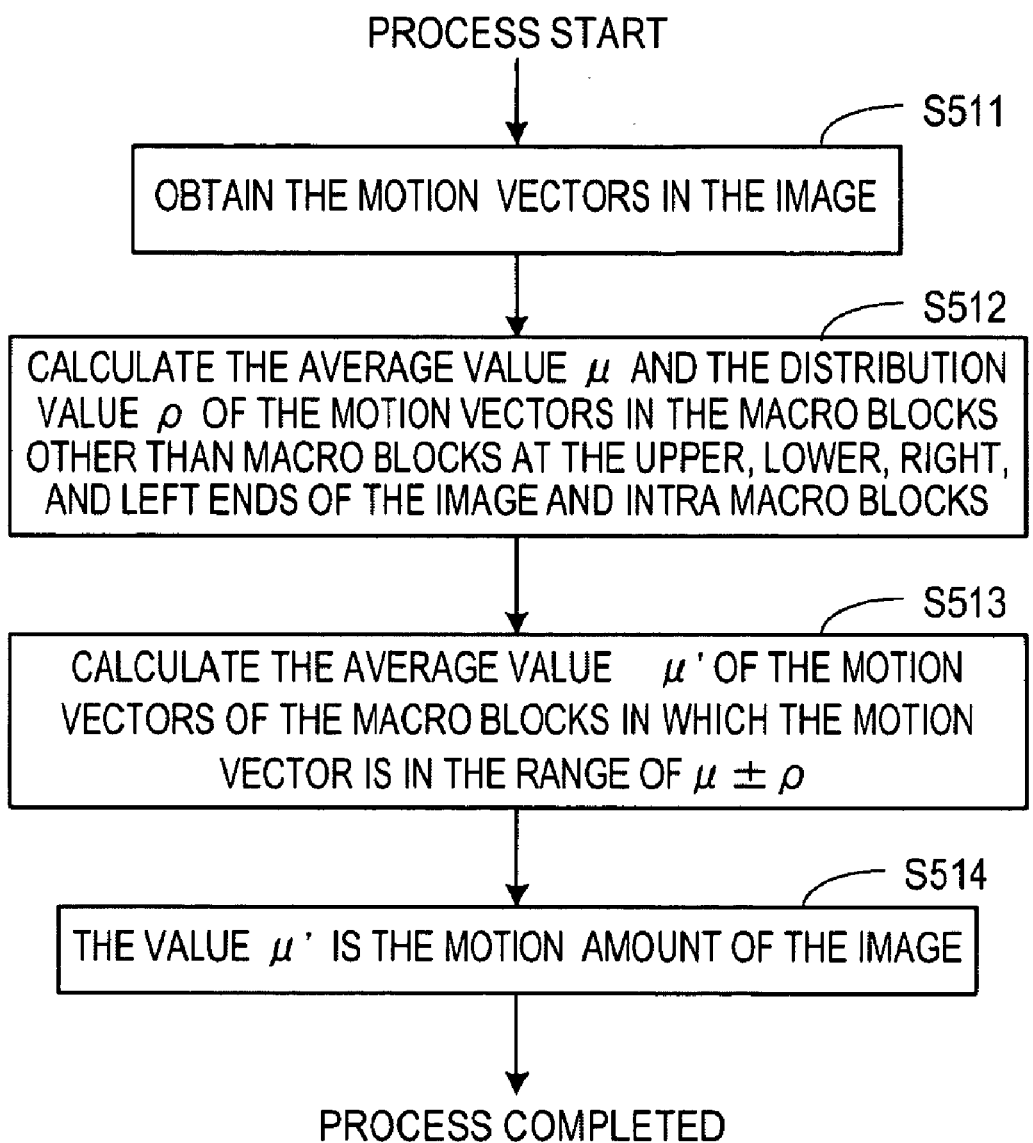
FIG. 5 is an operation flowchart for calculating the motion amount of the image.

FIG. 5 illustrates a flowchart for calculating the motion amount of the image. If it is determined by the motion vector quality determination unit 202 that the motion amount of the image may be calculated, the motion amount detection unit 203 calculates the motion amount of the image. In step S511, the motion amount detection unit 203 reads the motion vector in each macro block in the image. In step S511, the macro block may be an intra macro block having no motion vector, and a motion photographic object may come into a frame during the photographing. Therefore, the macro blocks at the upper, lower, right, and left ends of the image, and the intra macro blocks are not used to calculate the motion amount of the image. In step S512, the motion amount detection unit 203 calculates the average value μ and the distribution value ρ of the motion vectors in the macro blocks other than the macro blocks at the upper, lower, right, and left ends of the image and the intra macro block. A macro block having a motion vector with the value exceeding the range of the average value μ±the distribution value ρ is ignored because it is determined that image noise or a motion photographic object has come into a frame during the photographing. Therefore, the above-described macro block is not used to calculate the motion amount of the image. In step S513 and step S514, the motion amount detection unit 203 calculates average values μ' of the motion vectors in the macro blocks in which the motion vectors are equal to or within the range of μ±ρ, and then the average value μ' is considered the motion amount of the object image.

Figure 6:
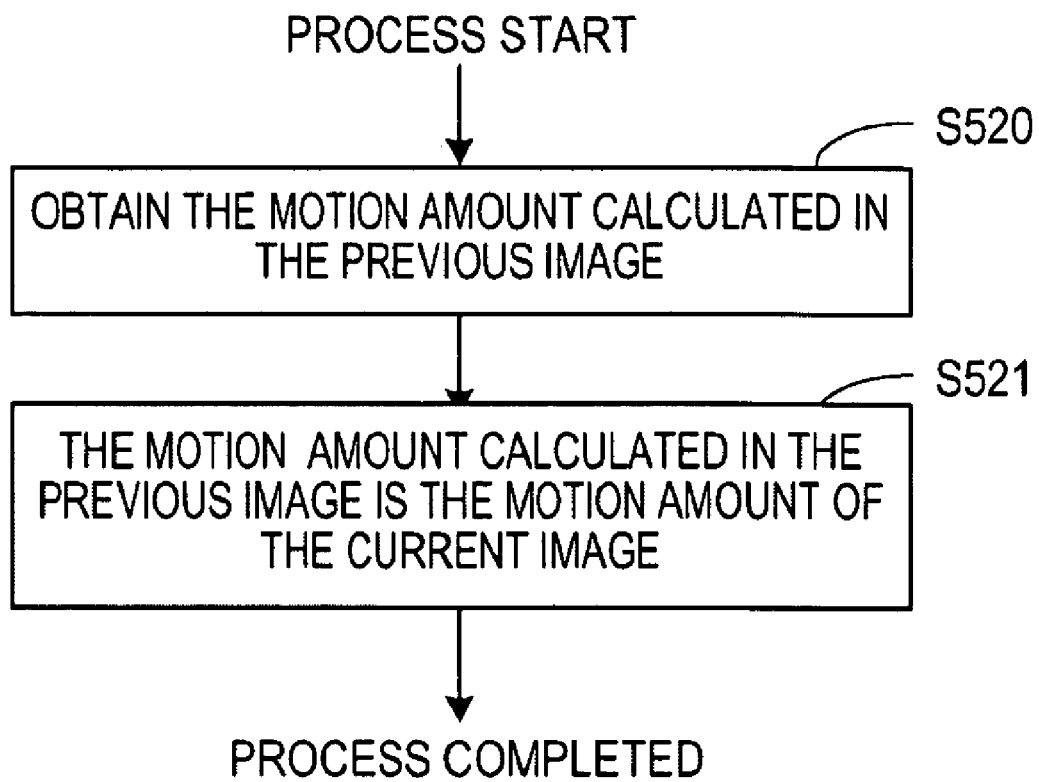
FIG. 6 is another operation flowchart for calculating the motion amount of the image.

FIG. 6 illustrates a flowchart for calculation of the motion amount of the image. If the motion vector quality determination unit 202 determines that the motion amount of the image may not be calculated, the motion amount calculation complementing unit 204 calculates the motion amount of the image. During the photographing, even when an object by which the motion amount may not be calculated is photographed, the processing is maintained by using the motion amount calculated in the previous image on the assumption that the photographer moves the electronic device 1 laterally at a fixed speed. In step S520 and step S521, the motion amount calculated by the motion amount detection unit 203 or the motion amount calculation complementing unit 204 in the previous image is read out and is applied as the motion amount of the current image.

Figure 7:
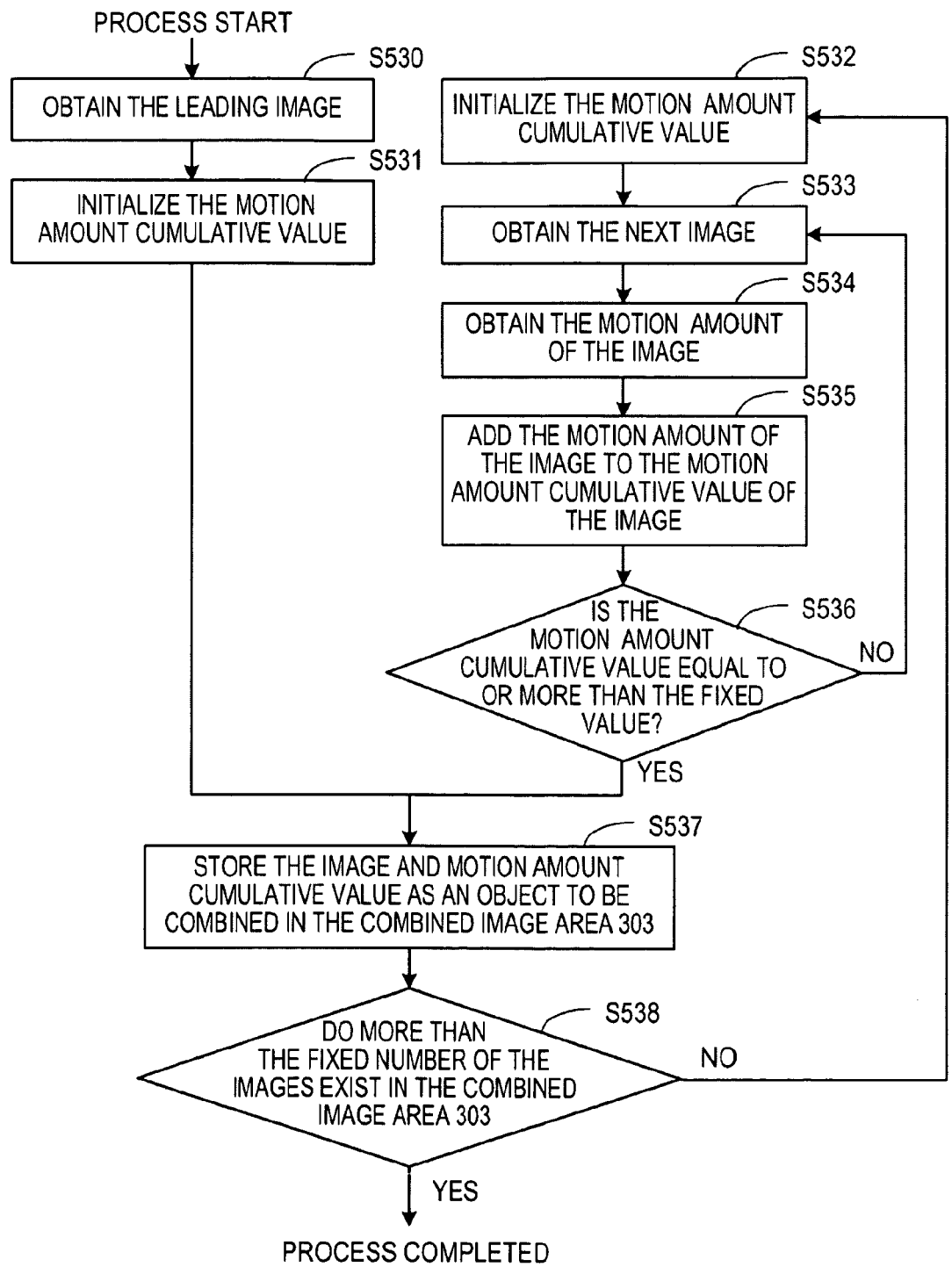
FIG. 7 is an operation flowchart for selecting an image to be combined from among successive images and calculating a positional relation between the images to be combined.

FIG. 7 illustrates a flowchart for selecting an image to be combined from among the successive images and for calculating a location relationship between the images to be combined.

The image selecting unit 205 selects the image to be combined from among the successive images and calculates the cumulative value of the motion amounts indicating the location relationship between the images to be combined based on the motion amounts calculated by the motion amount calculation unit 203 and the motion amount calculation complementing unit 204. In step S530, the leading image of the successive images is obtained. In step S531, the cumulative value of the motion amount is initialized. The leading image is selected as an image to be combined in step S537. As for the subsequent images, the motion amount cumulative value is initialized in step S532. In step S533 to step S535, the next image and the motion amount of the image are obtained, and then the motion amount of the image is added to the motion amount cumulative value. In step S536 and, the image is selected to be combined at the time when the motion amount cumulative value is a fixed value Vs or more. The fixed value Vs corresponds to the difference between the size of the images to be combined and the size of the partially overlapping area of the images to be combined. If the motion amount cumulative value is less than the fixed value Vs, the process goes back to step S533 to obtain the next image. In step S537, the image and the motion amount cumulative value as an object to be combined are stored in the combined image area 303. In step S538, if it is determined that more than an expected fixed number of images are selected, the process is completed.

Figure 8:
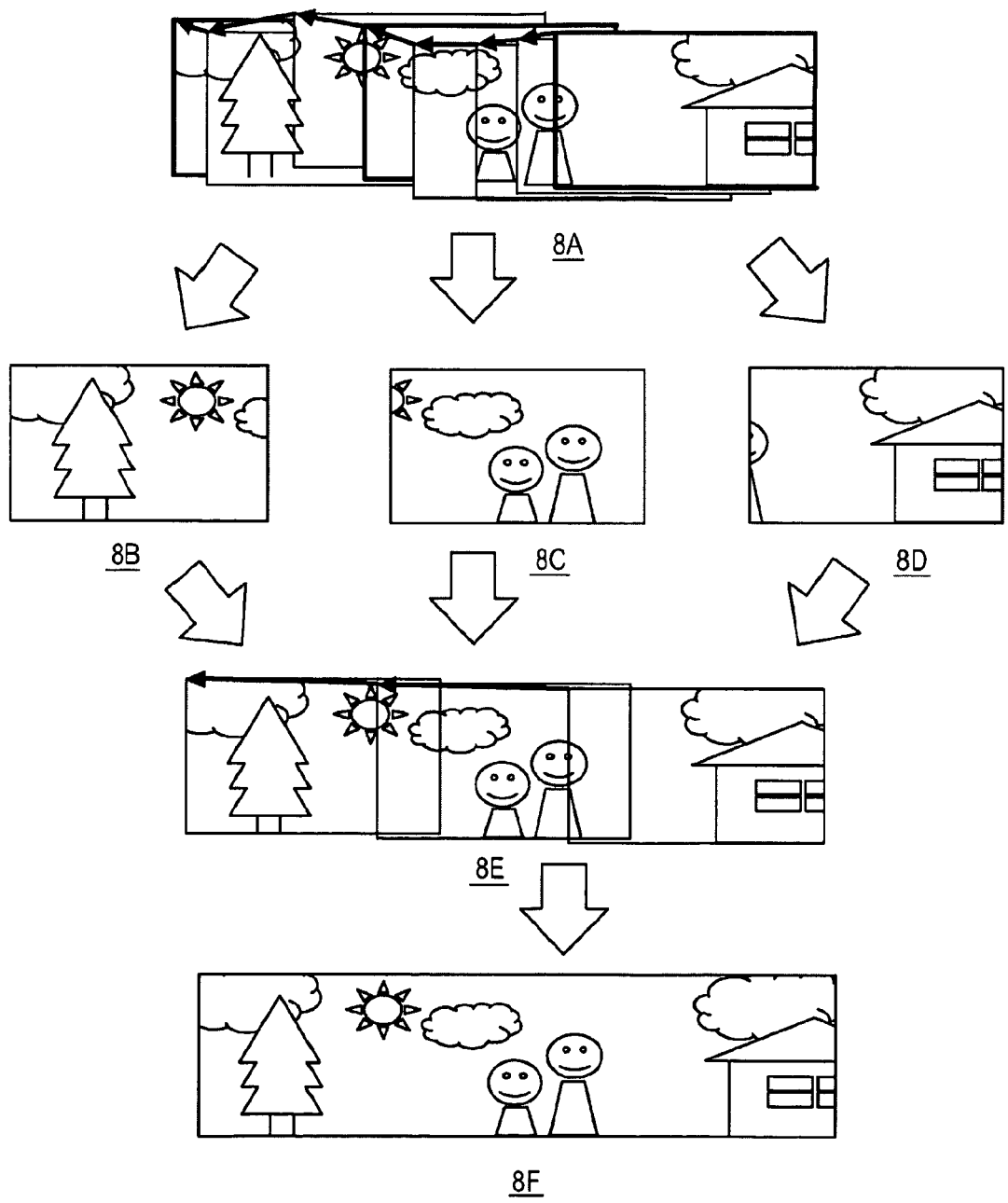
FIG. 8 is an operation description diagram illustrating calculation of the motion amount of the successive images, selection of the image to be combined, calculation of a cumulative value of the motion amount, and combination of the images.

FIG. 8 illustrates calculation of the motion amount of the successive images, selection of the image to be combined, and calculation of the motion amount cumulative value performed by the image selection unit 205, and combination of the images performed by the image combination unit 206.

In FIG. 8, 8A illustrates a motion amount calculation result of the successive images performed by the successive image and motion amount calculation unit 203 and the motion amount calculation complementing unit 204. 8B, 8C, and 8D illustrate results of selection of the images to be combined performed by the image selection unit 205. 8E illustrates a calculation result of the motion amount cumulative value performed by the image selection unit 205. 8F illustrates a combined image as a result of combination of the images performed by the image combination unit 206.

According to an embodiment of the present invention, it is possible to easily photograph images to be combined, to reduce the burden of the photographer, and to reduce failure of the photographing procedure performed by the photographer who may be unfamiliar with the operation, resulting in dislocated combined images.

Particularly, it is possible to combine images of successive images photographed as a motion picture into a desirable panoramic image by properly processing various movements of a person, an object, or the like through motion vectors.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it may be understood that the various changes, substitutions, and alterations could be made hereto without departing from the spirit and scope of the invention.

What is claimed is:

1. A photographing device that combines images from successive images photographed by a camera module into a panoramic image, the photographing device comprising:
    a motion amount calculation unit that calculates a motion amount of an image in the successive images;
    an image selection unit that selects an image to be processed based on the motion amount; and
    an image combination unit that combines overlapped parts by using a plurality of partially overlapped images selected by the image selection unit,
    wherein at the time of calculating the motion amount, the motion amount calculation unit complements a motion amount which was not calculated by reusing a motion amount calculated in a previous image when a number of effective motion vectors is smaller than a given number and the motion amount is not able to be calculated.

2. The photographing device according to claim 1, further comprising:
    a motion vector calculation unit that obtains position difference information of the successive images; and
    a motion vector quality determination unit that determines usability of the position difference information obtained by the motion vector calculation unit;
    wherein the motion amount calculation unit calculates a motion amount of an image when the motion vector quality determination unit determines the motion amount of the image is able to be calculated.

3. The photographing device according to claim 1, wherein the motion amount calculation unit calculates the motion amount between the images based on a motion vector in each macro block of the successive images, and wherein the image selection unit selects the image to be combined when a fixed motion amount calculated by the motion amount calculation unit is accumulated.

4. The photographing device according to claim 1, wherein the motion amount calculation unit obtains an average value of the motion vector in each macro block and excludes, from calculation objects of the motion amount, the motion vector having an error equal to or more than a fixed value compared to the average value.

5. A photographing method for combining images from successive images photographed by a camera module into a panoramic image, the photographing method comprising:

calculating a motion amount of an image in the successive images;

selecting an image to be processed based on the motion amount; and combining, overlapped parts by using a plurality of partially overlapped images selected by the selecting, wherein the calculating complements a motion amount which was not calculated by reusing a motion amount calculated in a previous image when a number of effective motion vectors is smaller than a given number and the motion amount is not able to be calculated.

6. The photographing method according to claim 5, the method further comprises:

obtaining position difference information of the successive images, and determining usability of the position difference information obtained by the obtaining, wherein the calculating calculates a motion amount of an image when the determining determines the motion amount of the image is able to be calculated.

7. The photographing method according to claim 5, wherein the calculating calculates the motion amount between the images based on a motion vector in each macro block of the successive images, and wherein the selecting selects the image to be combined when a fixed motion amount calculated by the calculating is accumulated.

8. The photographing method according to claim 5, wherein the calculating obtains an average value of the motion vector in each macro block and excludes, from calculation objects of the motion amount, the motion vector having an error equal to or more than a fixed value compared to the average value.

* * * * *